(12) United States Patent
Uchimura

(10) Patent No.: US 11,397,934 B2
(45) Date of Patent: Jul. 26, 2022

(54) INFORMATION PROCESSING APPARATUS, INFORMATION PROCESSING METHOD, AND STORAGE MEDIUM

(71) Applicant: NEC CORPORATION, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/043,242

(22) PCT Filed: Apr. 27, 2019

(86) PCT No.: PCT/JP2019/016645
§ 371 (c)(1),
(2) Date: Sep. 29, 2020

(87) PCT Pub. No.: WO2019/208394
PCT Pub. Date: Oct. 31, 2019

(65) Prior Publication Data
US 2021/0035085 A1 Feb. 4, 2021

(30) Foreign Application Priority Data
Apr. 27, 2018 (JP) .............................. JP2018-086927

(51) Int. Cl.
*G06Q 20/20* (2012.01)
*G07G 1/00* (2006.01)
(Continued)

(52) U.S. Cl.
CPC ........... *G06Q 20/208* (2013.01); *G06V 20/52* (2022.01); *G07G 1/0045* (2013.01); *G07G 1/12* (2013.01)

(58) Field of Classification Search
CPC .. G05D 1/0022; G05D 1/0088; G05D 1/0231; G05D 2201/0203; G05D 1/0016;
(Continued)

(56) References Cited

U.S. PATENT DOCUMENTS 9,395,723 B2 * 7/2016 Pari ........................... B25J 5/007
2002/0165638 A1 * 11/2002 Bancroft ................. A47F 10/00
700/213
(Continued)

FOREIGN PATENT DOCUMENTS

JP  7-325620 A  12/1995
JP  10-247286 A  9/1998
(Continued)

OTHER PUBLICATIONS

Vuckovac et al. From Shopping Aids to Fully Autonomous Mobile Self-checkouts—A Field Study in Retail.Proceedings of the 13th International Conference on Business computer science (pp. 927-941). (Year: 2017).*
(Continued)

*Primary Examiner* — Nathan A Mitchell
(74) *Attorney, Agent, or Firm* — Sughrue Mion, PLLC

(57) ABSTRACT

An information processing apparatus according to one example embodiment is an information processing apparatus that performs a checkout process for a product or a service, and the information processing apparatus includes: a motion unit that causes the information processing apparatus to autonomously move; a detection unit configured to detect a position of a person; and a control unit that controls the motion unit in accordance with the position of the person.

16 Claims, 8 Drawing Sheets

(51) Int. Cl.
 *G07G 1/12* (2006.01)
 *G06V 20/52* (2022.01)

(58) Field of Classification Search
 CPC ........... G01C 21/3476; G06Q 30/0631; G06Q 30/0617; G06K 7/1413; B62B 3/14; B62B 5/0069
 See application file for complete search history.

(56) References Cited

U.S. PATENT DOCUMENTS

| | | | |
|---|---|---|---|
| 2002/0165790 A1* | 11/2002 | Bancroft | G06Q 30/0201 705/7.29 |
| 2002/0170961 A1* | 11/2002 | Dickson | G06Q 30/02 235/383 |
| 2014/0152507 A1* | 6/2014 | McAllister | H01Q 1/362 342/126 |
| 2015/0025990 A1* | 1/2015 | Suzuki | G06Q 20/204 705/20 |
| 2017/0225321 A1* | 8/2017 | Deyle | B25J 9/1679 |
| 2018/0204163 A1* | 7/2018 | Bender | G06Q 30/02 |
| 2018/0232717 A1* | 8/2018 | Haraguchi | G07G 1/0018 |
| 2018/0253671 A1* | 9/2018 | Kuhara | A47L 9/2857 |
| 2018/0311815 A1* | 11/2018 | Shaw | G06F 9/45558 |
| 2019/0278289 A1* | 9/2019 | Nakajima | G05D 1/0276 |
| 2019/0302775 A1* | 10/2019 | Palan | B62D 57/028 |
| 2019/0324470 A1* | 10/2019 | Xiong | B25J 19/027 |
| 2021/0248541 A1* | 8/2021 | Heier | G06Q 10/063116 |

FOREIGN PATENT DOCUMENTS

| | | |
|---|---|---|
| JP | 2006-155039 A | 6/2006 |
| JP | 2008-87892 A | 4/2008 |
| JP | 2009-59288 A | 3/2009 |
| JP | 2009-187491 A | 8/2009 |
| JP | 2014-197411 A | 10/2014 |
| JP | 2016-166066 A | 9/2016 |

OTHER PUBLICATIONS

Navarro et al. A Mobile Robot Vending Machine for Beaches Based on Consumers' Preferences and Multivariate Methods. Procedia—Social and Behavioral Sciences, vol. 175, Feb. 12, 2015, pp. 122-129. (Year: 2015).*

Döring, N. et al. "User-Centered Design and Evaluation of a Mobile Shopping Robot." International Journal of Social Robotics 7 (2015): 203-225. (Year: 2015).*

"Why do they still put a sticker on my milk in the checkout lane?". Internet thread retrieved from <https://www.reddit.com/r/AskReddit/comments/106skp/why_do_they_still_put_a_sticker_on_my_milk_in_the/> on Jun. 25, 2021. Originally posted 2012. (Year: 2012).*

International Search Report for PCT/JP2019/016645 dated Jul. 9, 2019 (PCT/ISA/210).

* cited by examiner

INFORMATION PROCESSING APPARATUS, INFORMATION PROCESSING METHOD, AND STORAGE MEDIUM

CROSS REFERENCE TO RELATED APPLICATIONS

This application is a National Stage of International Application No. PCT/JP2019/016645 filed Apr. 18, 2019, claiming priority based on Japanese Patent Application No. 2018-086927 filed Apr. 27, 2018 the disclosure of which are incorporated herein in their entirety by reference.

TECHNICAL FIELD

The present invention relates to an information processing apparatus, an information processing method, and a storage medium.

BACKGROUND ART

Patent Literature 1 discloses a system that scans a barcode of a sample on a display shelf by using a portable Point Of Sales (POS) register and transmits the scanned information to a settlement machine by far-infrared rays.

CITATION LIST

Patent Literature

PTL 1: Japanese Patent Application Laid-open No. H10-247286

SUMMARY OF INVENTION

Technical Problem

In the system disclosed in Patent Literature 1, however, the settlement machine is installed in a settlement place, and a place to perform a checkout process is limited. Thus, in a case of a large shop, a crowded shop, or the like, for example, it may be difficult to perform a smooth checkout process.

The present invention has been made in view of the problem described above and intends to provide an information processing apparatus, an information processing method, and a storage medium that can perform a smooth checkout process.

Solution to Problem

According to one example aspect of the present invention, provided is an information processing apparatus that performs a checkout process for a product or a service, and the information processing apparatus includes: a motion unit that causes the information processing apparatus to autonomously move; a detection unit configured to detect a position of a person; and a control unit that controls the motion unit in accordance with the position of the person.

According to another example aspect of the present invention, provided is an information processing method in an information processing apparatus that performs a checkout process for a product or a service, and the information processing method includes: causing the information processing apparatus to autonomously move by a motion unit; detecting a position of a person; and controlling the motion unit in accordance with the position of the person.

According to another example aspect of the present invention, provided is a storage medium storing a program that causes a computer to perform an information processing method in an information processing apparatus that performs a checkout process for a product or a service, and the program includes: causing the information processing apparatus to autonomously move by a motion unit; detecting a position of a person; and controlling the motion unit in accordance with the position of the person.

Advantageous Effects of Invention

According to the present invention, it is possible to perform a smooth checkout process.

DESCRIPTION OF EMBODIMENTS

First Example Embodiment

The first example embodiment of the present invention will be described with reference to FIG. 1 to FIG. 5.

Figure 1:
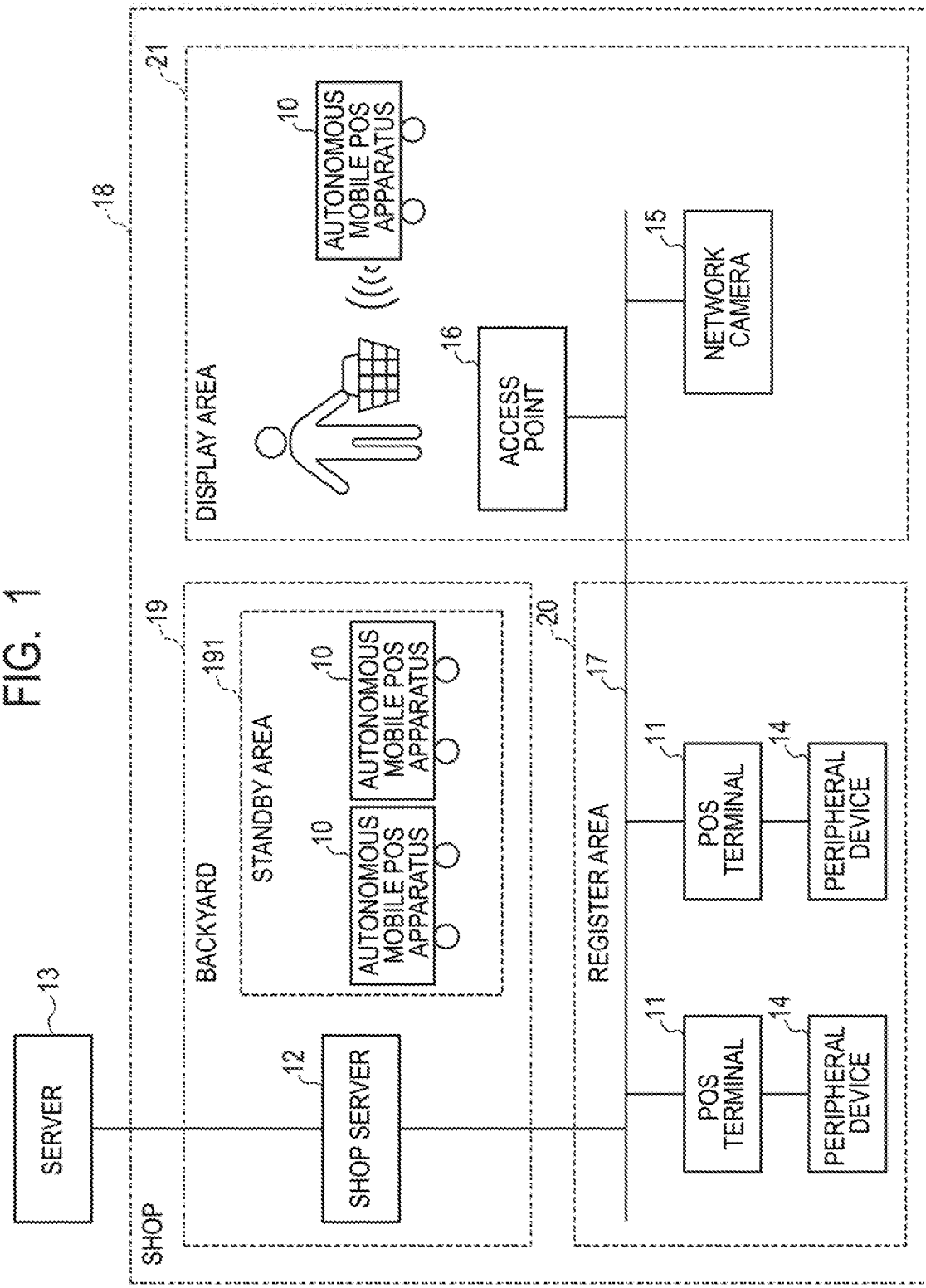
FIG. 1 is a schematic diagram illustrating a POS system using an autonomous mobile POS apparatus (information processing apparatus) according to a first example embodiment.

FIG. 1 is a schematic diagram illustrating a POS system (point-of-sales information management system) using an autonomous mobile POS apparatus 10 according to the present example embodiment. The POS system is a computer system introduced in a shop 18 that sells a product or provides a service and is used in an apparel shop, a service providing business site, or the like, for example. The POS system includes autonomous mobile POS apparatuses 10, POS terminals 11, a shop server 12, a server 13, peripheral devices 14, a network camera 15, and an access point 16. The POS terminals 11, the shop server 12, the network camera 15, and the access point 16 are connected to an intra-shop network 17 that is a local area network (LAN), for example. Note that a plurality of shops 18 may be managed by the server 13.

Each autonomous mobile POS apparatus 10 autonomously moves and functions as a POS apparatus that performs a checkout process for a product or a service. For example, the autonomous mobile POS apparatus 10 is charged in a standby area 191 of a backyard 19 and stands by in a state of being ready to autonomously move. For example, the autonomous mobile POS apparatus 10 detects a predetermined movement of a salesclerk, tracks the salesclerk, and moves to a display area 21. Accordingly, a customer is able to make payment by using the autonomous mobile POS apparatus 10 in the display area 21 without limited to a register area 20. For example, the autonomous mobile POS apparatus 10 wirelessly communicates with the access point 16 of the shop 18 via a wireless LAN connection such as Wi-Fi (registered trademark) and can transmit and receive data to and from the POS terminal 11, the shop server 12, and the network camera 15. For example, the access point 16 is installed on a ceiling or the like of the shop 18 and may be installed in a plurality of positions in accordance with the scale of the shop 18 or the like. The number of autonomous mobile POS apparatuses 10 is not particularly limited, and one or a plurality of autonomous mobile POS apparatuses 10 may be installed in one shop 18.

The POS terminal 11 is installed in a register counter of the register area 20, for example, and performs a checkout process for a product or a service. The POS terminal 11 is configured as a two-screen POS terminal having an operator display and a customer display, for example. The number of POS terminals 11 is not particularly limited, and one or a plurality of POS terminals 11 may be installed in one shop 18.

The shop server 12 is installed in the backyard 19, for example, and manages information related to products, stock, sales, or the like. The shop server 12 has a database storing product ID that specifies individual products, product names, prices, or the like.

The server 13 is connected to the shop server 12 via a network such as the Internet (not illustrated) and managed by a head office that supervises respective shops, for example. The server 13 aggregates and collectively manages sales data of respective shops.

Each of the peripheral devices 14 is connected to the POS terminal 11 and may be, for example, a code scanner, a printer, a contactless integrated circuit (IC) reader/writer, a cash drawer, or the like.

The network camera 15 is a surveillance camera installed on a ceiling of the display area 21 or the like, for example, and acquires image information on the display area 21. The image information acquired by the network camera 15 is used for calculating a people distribution density in the display area 21 by the autonomous mobile POS apparatus 10, for example.

Figure 2:
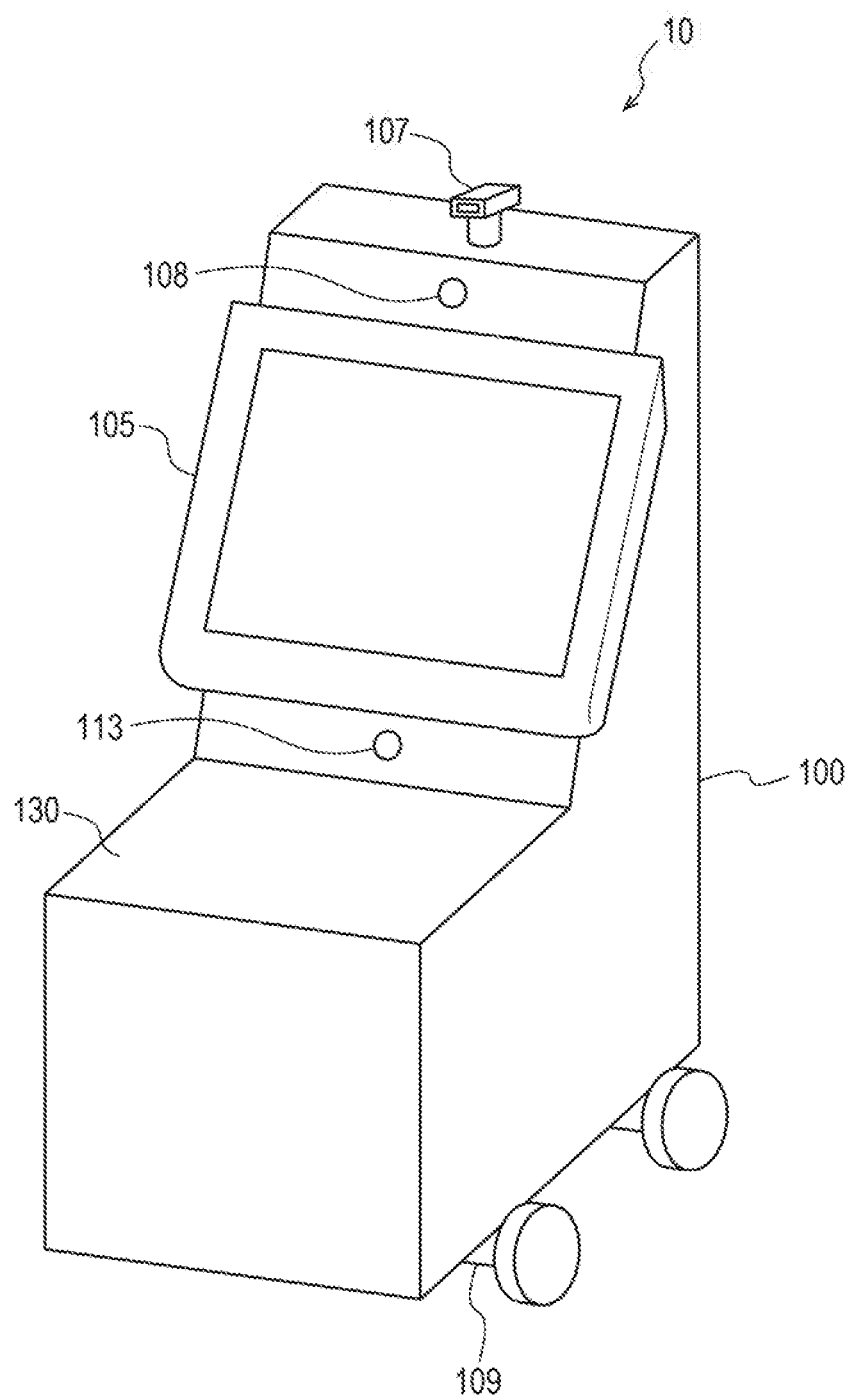
FIG. 2 is an external view illustrating an example of the autonomous mobile POS apparatus according to the first example embodiment.

FIG. 2 is an external view illustrating an example of the autonomous mobile POS apparatus 10 according to the present example embodiment. The autonomous mobile POS apparatus 10 has a base apparatus 100, a display device 105, a ranging device 107, a camera 108, a drive unit 109, a button 113, a placement stage 130, and the like.

The display device 105 is provided in the upper part of the base apparatus 100 and used by a salesclerk or a customer. The display device 105 includes a display using liquid crystal, an organic light emitting diode (OLED), a light emitting diode (LED), or the like and a touch panel provided on the display, for example. For example, information related to checkout, an advertisement, or the like is displayed on the display device 105. The display device 105 may be detachable from the base apparatus 100. In such a case, the display device 105 is a tablet terminal or the like, for example, and has a CPU, a memory, a communication interface (I/F) or the like. The salesclerk may detach the display device 105 from the base apparatus 100 and carries and uses the detached display device 105 in the shop.

The ranging device 107 is provided on the top of the base apparatus 100 and can detect a distance to a salesclerk or a customer. The autonomous mobile POS apparatus 10 can prevent collision with a person, autonomously move in accordance with motion of a person, or the like, for example, by using the ranging device 107.

The camera 108 is provided in the upper part of the base apparatus 100 and can capture an image of movement of a salesclerk or a customer. The autonomous mobile POS apparatus 10 can detect predetermined movement of a person, for example, based on an image acquired by the camera 108.

The drive unit 109 is provided in the lower part of the base apparatus 100 and functions as a motion unit that causes the autonomous mobile POS apparatus 10 to autonomously move. The drive unit 109 is formed of a motor, a reduction gear, a wheel, a tire, or the like, for example.

The button 113 is provided on the base apparatus 100 and formed of a button used for calling a salesclerk, a button used for causing the autonomous mobile POS apparatus 10 to move, or the like, for example. The placement stage 130 is provided on the base apparatus 100 and formed of a tray used for placing the peripheral device 14 thereon or the like, for example.

Figure 3:
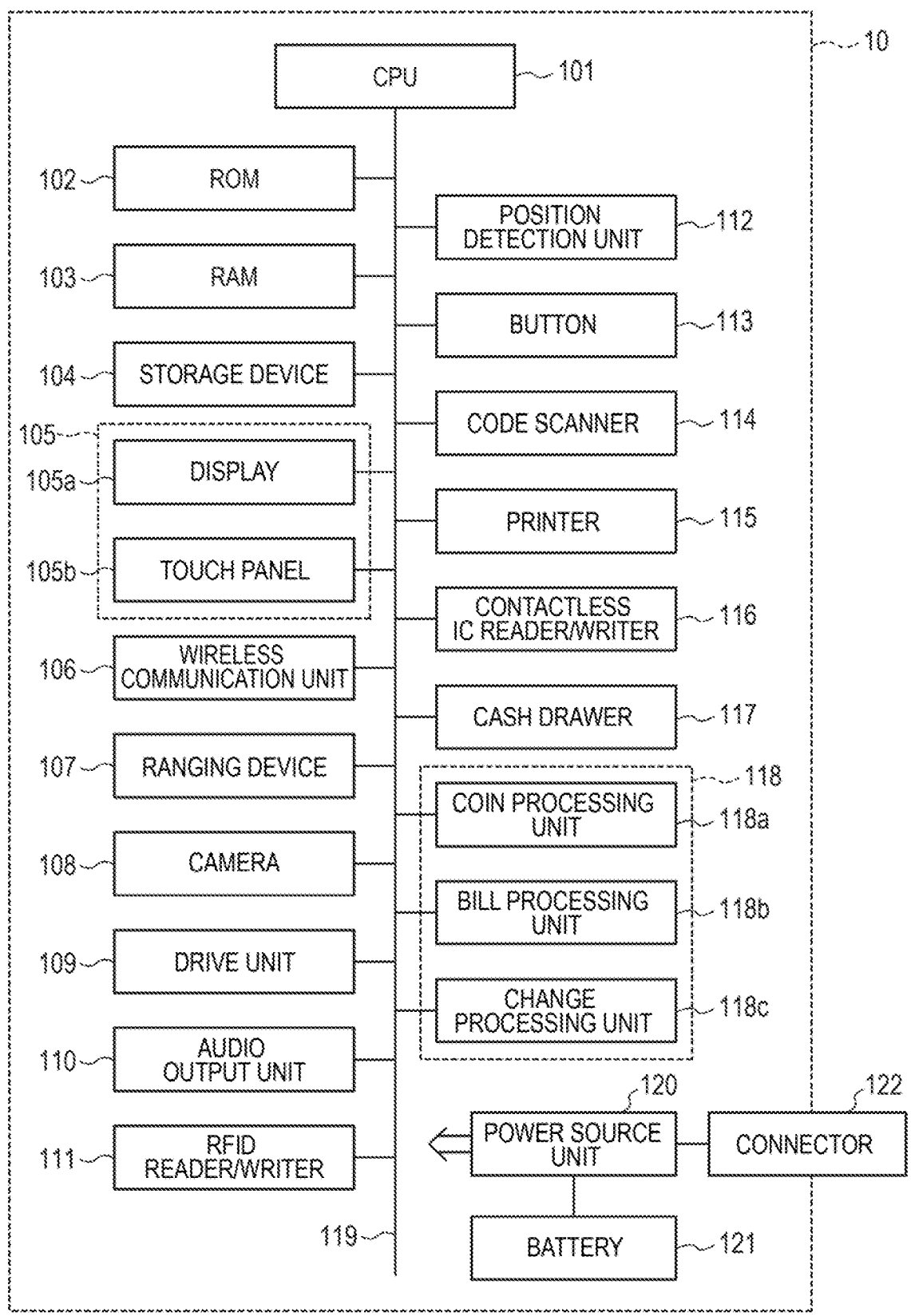
FIG. 3 is a block diagram of the autonomous mobile POS apparatus according to the first example embodiment.

FIG. 3 is a block diagram of the autonomous mobile POS apparatus 10 according to the present example embodiment. The autonomous mobile POS apparatus 10 has a CPU 101, a ROM 102, a RAM 103, a storage device 104, the display device 105, a wireless communication unit 106, the ranging device 107, the camera 108, the drive unit 109, an audio output unit 110, a Radio Frequency IDentification (RFID) reader/writer 111, a position detection unit 112, the button 113, a code scanner 114, a printer 115, a contactless IC reader/writer 116, a cash drawer 117, a money processing unit 118, a bus 119, a power source unit 120, a battery 121, and a connector 122. The CPU 101, the ROM 102, the RAM 103, the storage device 104, the display device 105, the wireless communication unit 106, the ranging device 107, the camera 108, the drive unit 109, the audio output unit 110, the RFID reader/writer 111, the position detection unit 112, the button 113, the code scanner 114, the printer 115, the contactless IC reader/writer 116, the cash drawer 117, and the money processing unit 118 are connected to each other via a bus 119. The battery 121 and the connector 122 are connected to the power source unit 120.

The CPU 101 controls each component of the autonomous mobile POS apparatus 10 by an application program. The ROM 102 is formed of a nonvolatile memory and stores an application program used for controlling each component of the autonomous mobile POS apparatus 10. The RAM 103 provides a memory region required for the operation of the CPU 101. The storage device 104 is a large capacity storage device such as a hard disk.

The display device 105 includes a display 105a and a touch panel 105b. The display 105a may be, for example, a liquid crystal display, an OLED display, a LED display, or the like and has a driver circuit and an image processing circuit. The touch panel 105b has a touch sensor that detects a change in the electrostatic capacitance or a change in the resistance.

The wireless communication unit 106 is a communication unit that transmits and receives data by wireless communication and is configured to be able to perform short-range wireless communication such as Bluetooth (registered trademark), wireless communication by a wireless LAN connection such as Wi-Fi, infrared wireless communication, or the like, for example. The autonomous mobile POS apparatus 10 can communicate with the POS terminal 11, the shop server 12, and the network camera 15 via the wireless communication unit 106.

The ranging device 107 is formed of a Light Detection and Ranging (LiDAR) device, a stereo camera device, or the like, for example, and acquires a space distribution of the distance to a ranging target. Ranging performed by the ranging device 107 may be three-dimensional measurement to measure a distance in the depth direction while scanning two directions of the vertical direction and the horizontal direction, for example. In such a case, the ranging device 107 can acquire three-dimensional information within a range including a salesclerk or a customer. Note that, when the ranging device 107 is formed of a LiDAR device, ranging accuracy in the depth direction can be improved compared to a case where a stereo camera or the like is employed. The type of the laser light source used in the LiDAR device is not particularly limited and may be, for example, a laser light source that emits invisible light such as an infrared ray.

The camera 108 has an area sensor such as a charge coupled device (CCD) sensor or a complementary metal oxide semiconductor (CMOS) sensor and an analog-to-digital conversion circuit, for example.

The drive unit 109 causes the autonomous mobile POS apparatus 10 to move freely under the control of the CPU 101. The audio output unit 110 has a digital-to-analog conversion circuit that converts audio data into an analog signal and an amplifier circuit that amplifies an analog signal and drives a speaker. The audio output unit 110 outputs a sound for preventing collision with a person, a guide voice to a customer, or the like, for example.

The RFID reader/writer 111 performs near field communication with an RFID chip storing a product ID, for example, and receives and outputs the product ID. Once a customer makes payment for a product, the RFID reader/writer 111 writes payment completion information to the RFID chip embedded in a tag of the paid product, for example, under the control of the CPU 101.

The position detection unit 112 transmits a radio intensity from the access point 16 of the shop 18 to a position information calculation server (not illustrated) and acquires position information calculated by the position information calculation server from the position information calculation server, for example. For example, the position information calculation server calculates position information from a radio intensity model measured in advance by using a technique of triangulation. For example, position information acquired by the position detection unit 112 is transmitted to the POS terminal 11, the shop server 12, a salesclerk terminal possessed by a salesclerk, or the like and used for knowing the position of the autonomous mobile POS apparatus 10.

The button 113 is formed of a button used for calling a salesclerk, a button used for causing the autonomous mobile POS apparatus 10 to move, or the like, for example. The code scanner 114 has a CCD sensor or a CMOS sensor, an LED light source, and an analog-to-digital conversion circuit. The CCD sensor or the CMOS sensor may be a line sensor or an area sensor.

The printer 115 has a sheet discharge mechanism for a roll sheet, an ink jet mechanism, and a driver circuit and prints and outputs a receipt or the like. The contactless IC reader/writer 116 acquires credit card information, electronic money information, or the like for payment from a mobile terminal or a contactless IC chip of a medium such as a card possessed by a customer, for example.

The cash drawer 117 stores coins, bills or the like for cash payment and is opened under the control of the CPU 101. The cash drawer 117 is used when a customer makes cash payment via a salesclerk.

The money processing unit 118 has a coin processing unit 118a, a bill processing unit 118b, and a change processing unit 118c. The money processing unit 118 functions when a customer uses the autonomous mobile POS apparatus 10 as a self-service register to make cash payment.

The coin processing unit 118a has a coin conveyance mechanism, a sensor that detects the type of a coin, a coin sorting mechanism that sorts coins by type, a counter that counts coins on a type basis, and a coin storage box that stores coins. The coin processing unit 118a stores supplied coins in the coin storage box on a type basis in accordance with the type of a coin detected by the sensor.

The bill processing unit 118b has a bill conveyance mechanism, a sensor that detects the type of a bill, a bill sorting mechanism that sorts bills by type, a counter that counts bills on a type basis, and a bill storage box that stores bills. The bill processing unit 118b stores supplied bills in the bill storage box on a type basis in accordance with the type of a bill detected by the sensor.

The change processing unit 118c has a control unit that determines a type (types) of a coin (coins) or a bill (bills) constituting change and a conveyance mechanism that outputs the change from the coin storage box or the bill storage box.

The connector 122 is a connector for connecting the autonomous mobile POS apparatus 10 to a battery charger. When the connector 122 is connected to a connector of a battery charger, the autonomous mobile POS apparatus 10 is electrically connected to the battery charger. Note that a connection scheme is not particularly limited, and various schemes can be employed. For example, a connection scheme such that the connector 122 and the connector of a battery charger are formed of contact terminals where contact points corresponding to each other are arranged, these contact terminals are positioned by attractive force of magnets, a three-dimensional shape, or the like to cause contact points corresponding to each other to come into contact with each other, and thereby both the connectors are electrically connected to each other may be employed. Further, for example, a connection scheme such that the connector of the battery charger is formed of a male type, the connector 122 is formed of a female type, and the connector of the battery charger is fit into the connector 122, and thereby both the connectors are electrically connected to each other may be employed.

When the autonomous mobile POS apparatus 10 is connected to a battery charger, the power source unit 120 charges the battery 121 with charging power supply supplied from the battery charger. Further, the power source unit 120 supplies driving power supply supplied from the battery charger to each component of the autonomous mobile POS apparatus 10.

When the autonomous mobile POS apparatus 10 is not connected to a battery charger, the power source unit 120 supplies driving power supply supplied from the battery 121 to each component of the autonomous mobile POS apparatus 10. When the battery level of the battery 121 decreases to a predetermined threshold or lower, the autonomous mobile POS apparatus 10 moves to the standby area 191 where the battery charger is installed. For example, when the autonomous mobile POS apparatus 10 stops at a predetermined charging spot provided in the standby area 191, the connector 122 is connected to the connector of a battery charger, and charging of the battery 121 is automatically performed. Further, when the battery level decreases to a predetermined threshold or lower, the autonomous mobile POS apparatus 10 outputs a warning to a salesclerk or a customer. A warning output method may be, for example, a method of displaying a warning message to the effect that the battery level is the predetermined threshold or lower on the display device 105, a method of outputting the message by voice by using the audio output unit 110, or the like. Note that a salesclerk may connect the autonomous mobile POS apparatus 10 to a battery charger to charge the battery 121. In such a case, the autonomous mobile POS apparatus 10 transmits a warning to the effect that the battery level is a predetermined threshold or lower to the POS terminal 11, the shop server 12, a salesclerk terminal possessed by a salesclerk, or the like, for example, via the wireless communication unit 106. Accordingly, the salesclerk can know that the battery level of the battery 121 is low and promptly have the autonomous mobile POS apparatus 10 charged.

Note that the code scanner 114, the printer 115, the contactless IC reader/writer 116, and the cash drawer 117 may be fixed and provided to the casing of the autonomous mobile POS apparatus 10 or may be detachable from the autonomous mobile POS apparatus 10. When being detachable, these devices may be placed on the placement stage 130, for example.

Figure 4:
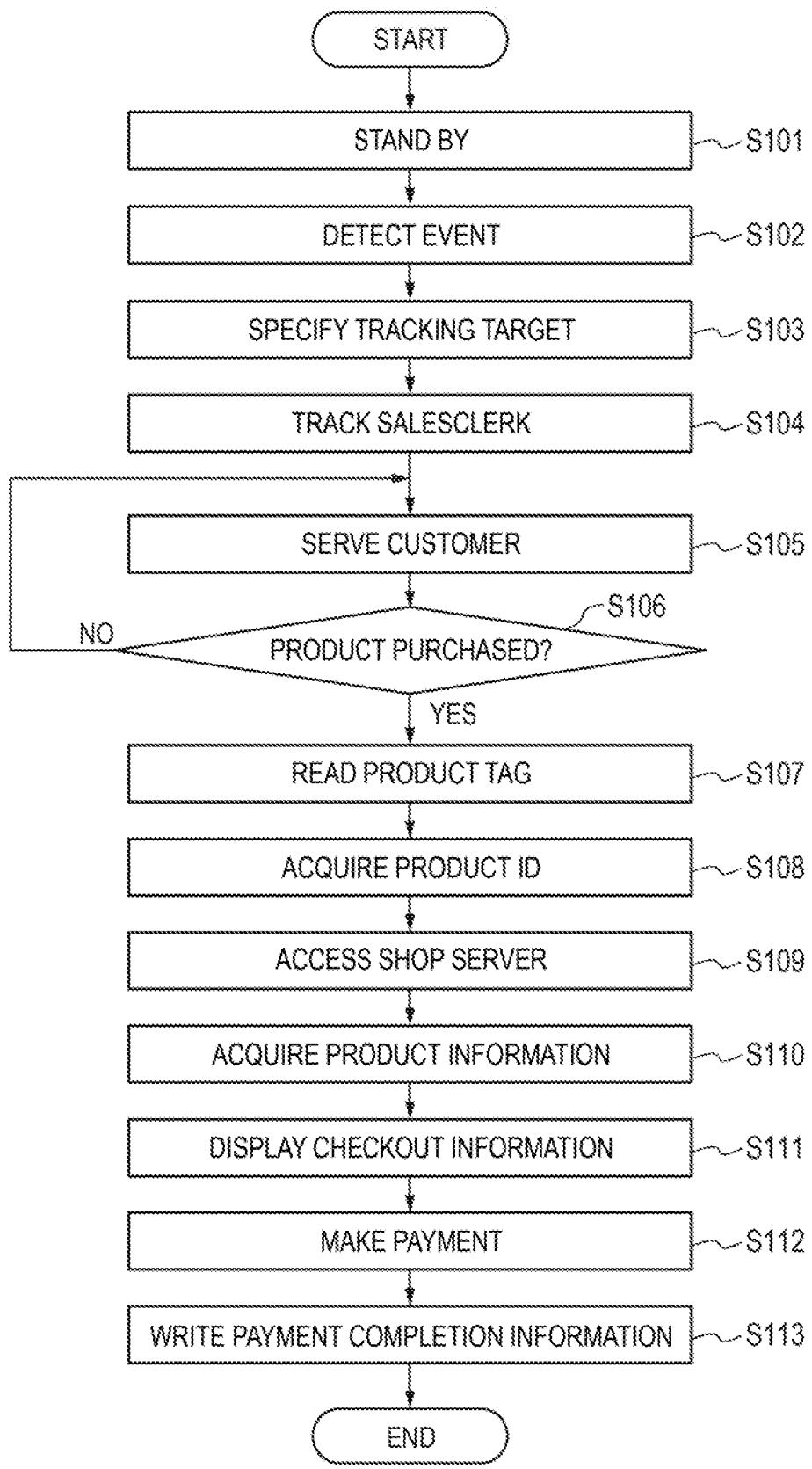
FIG. 4 is a flowchart illustrating an example of a checkout process using the autonomous mobile POS apparatus according to the first example embodiment.

FIG. 4 is a flowchart illustrating an example of a checkout process using the autonomous mobile POS apparatus 10 according to the present example embodiment.

First, the autonomous mobile POS apparatus 10 is charged in the standby area 191 and stands by in a state of being ready to autonomously move (step S101). When a salesclerk performs a predetermined event, the autonomous mobile POS apparatus 10 detects the event (step S102). The predetermined event may be, for example, performing predetermined movement, pressing a button, inputting a command, or the like. The predetermined movement may be, for example, a gesture such as raising a hand, opening a hand, shaking a hand, or the like. The autonomous mobile POS apparatus 10 specifies a salesclerk who is a tracking target (step S103).

The autonomous mobile POS apparatus 10 tracks the salesclerk while maintaining a constant distance to the salesclerk by using the ranging device 107 (step S104). The constant distance is not particularly limited, which may be any distance so that customer service, work, or the like made by a salesclerk is not obstructed and may be around 2 m, for example. The salesclerk moves in the display area 21 if necessary and serves a customer (step S105). If the served customer purchases a product (step S106, YES), the salesclerk uses the RFID reader/writer 111 to read a tag attached to the product purchased by the customer (step S107). An RFID chip storing the product ID is embedded in the product tag. Note that the autonomous mobile POS apparatus 10 moves closer to the salesclerk based on a predetermined gesture of the salesclerk or the like, for example, and the salesclerk is able to operate the autonomous mobile POS apparatus 10. On the other hand, if the served customer does not purchase a product (step S106, NO), the process returns to step S105.

The autonomous mobile POS apparatus 10 acquires the product ID from the RFID chip embedded in the product tag by using the RFID reader/writer 111 (step S108). Note that, when no RFID chip is embedded in a product tag, the autonomous mobile POS apparatus 10 reads a product code on the product tag by using the code scanner 114 and acquires the product ID, for example. In such a case, the product code may be a one-dimensional barcode or may be a two-dimensional code such as a QR code (registered trademark). The autonomous mobile POS apparatus 10 accesses the shop server 12 via the wireless communication unit 106 (step S109) and acquires product information from a database based on the product ID (step S110). The autonomous mobile POS apparatus 10 displays checkout information such as a product name, a price, or the like on the display device 105 (step S111). The customer makes payment by using the autonomous mobile POS apparatus 10 in the display area 21 based on the checkout information displayed on the display device 105 (step S112). The autonomous mobile POS apparatus 10 writes the payment completion information to the RFID chip embedded in the product tag by using the RFID reader/writer 111 (step S113). Thereby, it is possible to distinguish a paid product and an unpaid product. For example, it is possible to prevent an unpaid product from being brought out of a shop by installing gates that can read RFID chip information at the entrance and the exit of the shop 18 and outputting a warning sound or the like when an unpaid product is brought out of the shop.

Note that the checkout process for a service is performed based on a medium in which an RFID chip storing a service ID is embedded, for example. The service ID is information for specifying a service. The medium may be, for example, a sheet, a card, a plate, or the like. After a customer makes payment for a service, the autonomous mobile POS apparatus 10 writes payment completion information to the RFID chip embedded in the medium of the paid service by using the RFID reader/writer 111. Thereby, it is possible to distinguish a paid service and an unpaid service.

Figure 5:
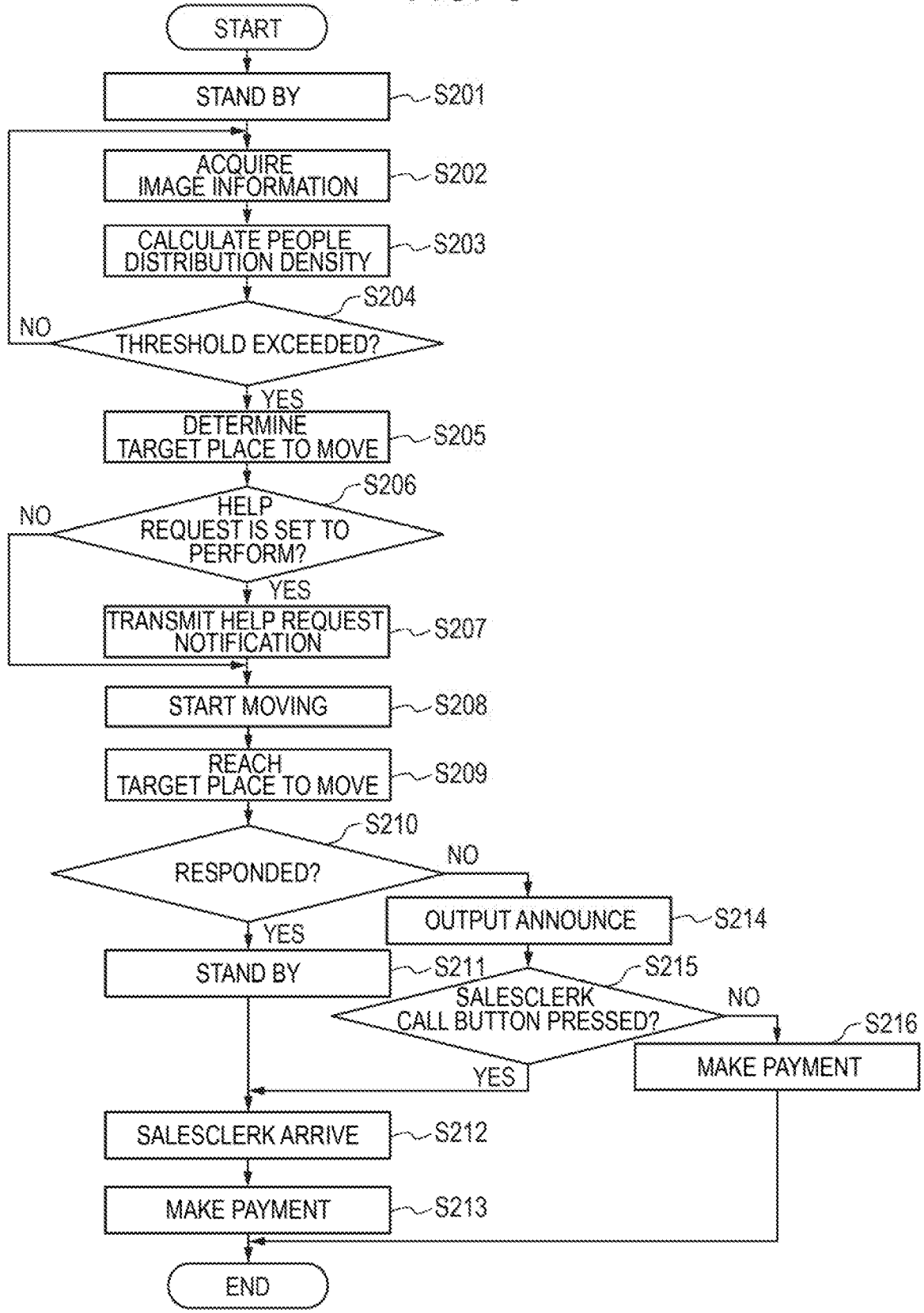
FIG. 5 is a flowchart illustrating an example of a process using the autonomous mobile POS apparatus according to the first example embodiment.

FIG. 5 is a flowchart illustrating an example of a process using the autonomous mobile POS apparatus 10 according to the present example embodiment.

First, the autonomous mobile POS apparatus 10 is charged in the standby area 191 and stands by in a state of being ready to autonomously move (step S201). The autonomous mobile POS apparatus 10 acquires image information on the display area 21 and information that specifies a captured area in the display area 21 from the network camera 15 via the wireless communication unit 106 (step S202). The autonomous mobile POS apparatus 10 calculates a people distribution density in the display area 21 based on the image information (step S203).

The autonomous mobile POS apparatus 10 determines whether or not the people distribution density exceeds a predetermined threshold (step S204). If it is determined that the people distribution density exceeds the predetermined threshold (step S204, YES), the autonomous mobile POS apparatus 10 determines a target place to move in the display area 21 (step S205). The target place to move may be, for example, a captured area where the people distribution density exceeds a predetermined threshold, a place near such a captured area, or the like. That is, the autonomous mobile POS apparatus 10 moves to a place where customers are concentrated in the display area 21. Accordingly, the customer can make payment by using the autonomous mobile POS apparatus 10 in the display area 21 without moving to the register area 20 from a crowded place. On the other hand, if it is determined that the people distribution density does not exceed the predetermined threshold (step S204, NO), the process returns to step S202.

The autonomous mobile POS apparatus 10 determines whether or not a help request notification is set to be transmitted to a salesclerk terminal possessed by a salesclerk (step S206). The help request notification includes information related to a target place to move. If it is determined that a help request notification is set to be transmitted (step S206, YES), the autonomous mobile POS apparatus 10 transmits a help request notification to a salesclerk terminal (step S207). On the other hand, if it is determined that a help request notification is not set to be transmitted (step S206, NO), the process proceeds to step S208.

The autonomous mobile POS apparatus 10 starts moving (step S208) and reaches a target place to move in the display area 21 (step S209). The autonomous mobile POS apparatus 10 determines whether or not there is a response from the salesclerk terminal (step S210). If it is determined that there is a response from the salesclerk terminal (step S210, YES), the autonomous mobile POS apparatus 10 stands by in the display area 21 (step S211). The salesclerk reaches the target place to move and serves the customer (step S212). If the customer purchases a product, the salesclerk performs reading of a product tag by using the autonomous mobile POS apparatus 10 or the like, and the customer makes payment by using the autonomous mobile POS apparatus 10 in the display area 21 (step S213).

If it is determined that there is no response from the salesclerk terminal (step S210, NO), the autonomous mobile POS apparatus 10 outputs an announce to the customer by using the audio output unit 110 (step S214). The case where there is no response from the salesclerk terminal may be, for example, a case where a salesclerk who noticed the help request notification is unable to respond because of serving another customer or the like, a case where setting to perform a help request is disabled, or the like. The announce message may be, for example, a message such as "Please push clerk call button if you need clerk's assistance", a message related to an advertisement for a product or a service, or the like. Note that such a message may be displayed on the display device 105. If a customer pushes a salesclerk call button (step S215, YES), the process proceeds to step S212. In such a case, the autonomous mobile POS apparatus 10 transmits position information acquired by the position detection unit 112 to the POS terminal 11, the shop server 12, a salesclerk terminal possessed by a salesclerk, or the like together with the salesclerk call notification. Accordingly, the salesclerk is able to promptly move to the place of the customer who pushed the salesclerk call button and serve the customer. On the other hand, if the customer does not push the salesclerk call button (step S215, NO), the customer makes payment by using the autonomous mobile POS apparatus 10 in the display area 21 based on guidance as to how to use a self-service register displayed on the display device 105 or the like (step S216). The guidance may be, for example, guidance as to how to have a product tag read, have an IC card read in electronic payment, supply a coin and input a bill in cash payment, or the like. In such a way, a customer can select whether or not to call a salesclerk by using the autonomous mobile POS apparatus 10. Note that a customer may call a salesclerk by performing a predetermined gesture, inputting a command, or the like, for example.

Note that, if it is determined that the people distribution density exceeds a predetermined threshold, the autonomous mobile POS apparatus 10 may determine a motion path and a target place to move so as to avoid a place where customers are concentrated, for example. In such a case, the autonomous mobile POS apparatus 10 avoids a crowded place and moves to a place where customers are not concentrated. Accordingly, a customer is able to make payment by using the autonomous mobile POS apparatus 10 in an uncrowded place while the autonomous mobile POS apparatus 10 does not obstruct customer's shopping. It is desirable that the threshold in such a case be higher than the threshold in step S204. In such a way, by using a plurality of different thresholds, it is possible to move the autonomous mobile POS apparatus 10 to a place suitable for a checkout process. Note that the autonomous mobile POS apparatus 10 may output a voice announce or the like after reaching the target place to move and let a customer to know a position of the autonomous mobile POS apparatus 10.

Further, based on the usage status of an autonomous mobile POS apparatus 10A, a target place to move may be determined for another autonomous mobile POS apparatus 10B. For example, a case where the autonomous mobile POS apparatus 10A has already moved to a predetermined place in the display area 21 and is used by a salesclerk or a customer is assumed. When the people distribution density in a predetermined place of the display area 21 is high, another autonomous mobile POS apparatus 10B may be caused to move closer to the predetermined place. By arranging another autonomous mobile POS apparatus 10B near the predetermined place, the customer is able to make payment by using the autonomous mobile POS apparatus 10 in the display area 21 without moving to the register area 20 from the crowded place.

Although a case of calculating a people distribution density to determine a target place to which the autonomous mobile POS apparatus 10 moves has been described in FIG. 5, the example embodiment is not limited thereto. For example, a target place to which the autonomous mobile POS apparatus 10 moves may be determined based on positions of a plurality of persons. Further, when more persons than the threshold are present in a predetermined place in the shop, the predetermined place or a place nearby may be determined as a target place to which the autonomous mobile POS apparatus 10 moves.

As described above, in the present example embodiment, a customer makes payment by using the autonomous mobile POS apparatus 10 in the display area 21 without limited to the register area 20. Thus, according to the present example embodiment, it is possible to perform a smooth checkout process.

Second Example Embodiment

The second example embodiment of the present invention will be described with reference to FIG. 6. The same components as those in the first example embodiment are labeled with the same references, and the description thereof will be omitted or simplified.

The present example embodiment assumes a case where the autonomous mobile POS apparatus 10 moves on a predetermined path based on induction current from an electric wire installed in a floor, a magnetic tape or a marker attached on a floor, or the like, for example, in the same manner as an automated guided vehicle (AGV). The autonomous mobile POS apparatus 10 moves based on a schedule pre-registered by a salesclerk. The schedule includes time to start moving, a motion path, a target place to move, a standby period at a target place to move, or the like, for example. A customer uses the autonomous mobile POS apparatus 10 as a self-service register, and gates that can read RFID chip information are installed at the entrance and the exit of the shop 18.

Figure 6:
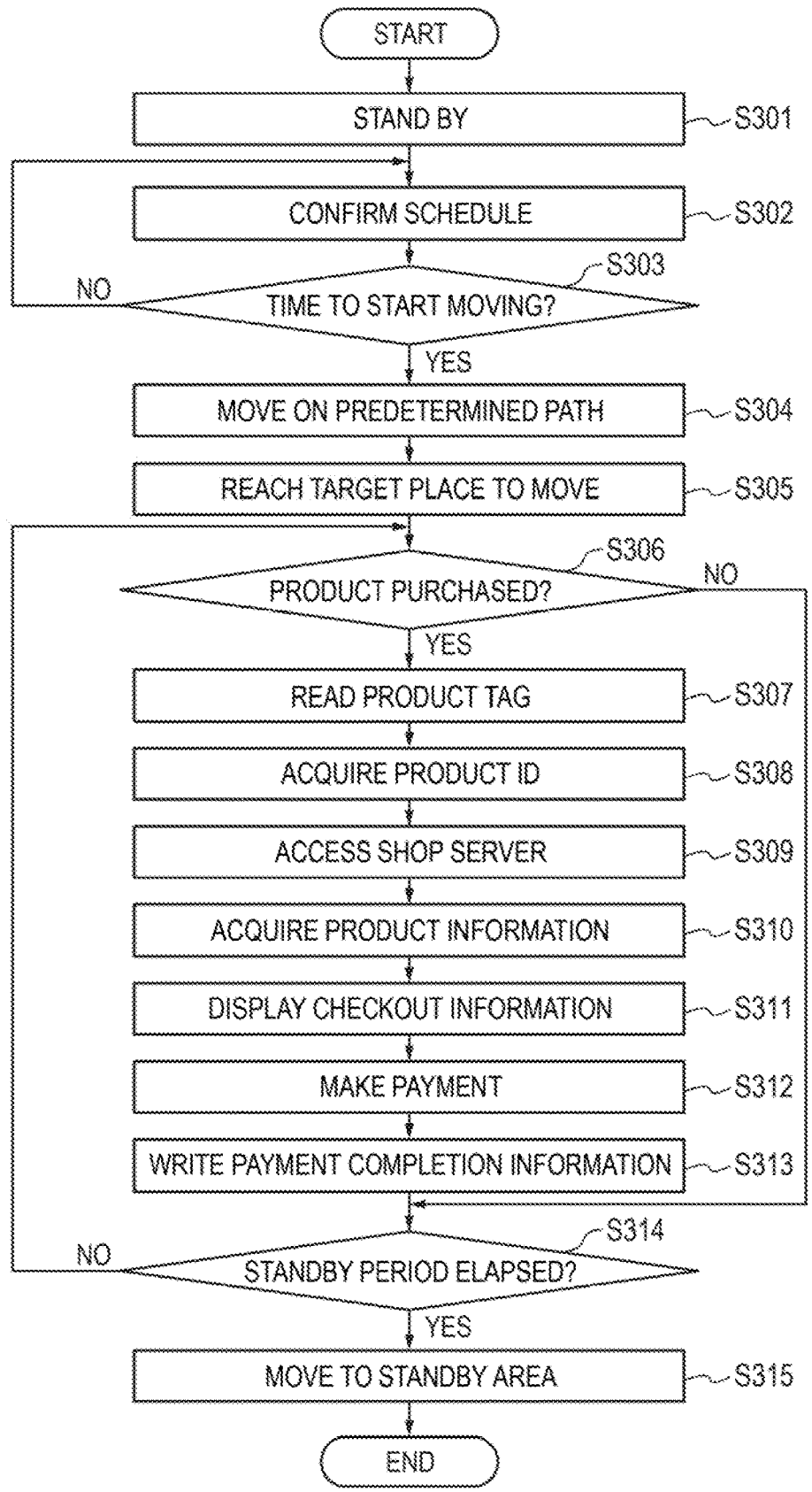
FIG. 6 is a flowchart illustrating an example of a checkout process using the autonomous mobile POS apparatus according to a second example embodiment.

FIG. 6 is a flowchart illustrating an example of a checkout process using the autonomous mobile POS apparatus 10 according to the present example embodiment.

First, the autonomous mobile POS apparatus 10 is charged in the standby area 191 and stands by in a state of being ready to autonomously move (step S301). The autonomous mobile POS apparatus 10 confirms a pre-registered schedule (step S302) and determines whether or not the current time is the time to start moving (step S303). If it is determined that the current time is the time to start moving (step S303, YES), the autonomous mobile POS apparatus 10 moves on a predetermined path based on a registered schedule (step S304). On the other hand, if it is determined that the current time is not the time to start moving (step S303, NO), the process returns to step S302.

The autonomous mobile POS apparatus 10 reaches a target place to move registered in the schedule (step S305). If a customer purchases a product (step S306, YES), the customer uses the RFID reader/writer 111 to read a tag attached to the product to be purchased based on guidance as to how to use a self-service register displayed on the display device 105 or the like (step S307). The guidance may be, for example, guidance as to how to have a product tag read, have an IC card read in electronic payment, supply a coin and input a bill in cash payment, or the like. On the other hand, if the customer does not purchase a product (step S306, NO), the process proceeds to step S314.

The autonomous mobile POS apparatus 10 acquires the product ID from an RFID chip embedded in a product tag by using the RFID reader/writer 111 (step S308). The autonomous mobile POS apparatus 10 accesses the shop server 12 via the wireless communication unit 106 (step S309) and acquires product information from a database based on the product ID (step S310). The autonomous mobile POS apparatus 10 displays checkout information such as the product name, the price, or the like on the display device 105 (step S311). The customer makes payment by using the autonomous mobile POS apparatus 10 in the display area 21 based on the checkout information displayed on the display device 105 (step S312). The autonomous mobile POS apparatus 10 writes payment completion information to the RFID chip embedded in the product tag by using the RFID reader/writer 111 (step S313). Since gates that can read RFID chip information are installed at the entrance and the exit of the shop 18, if a customer brings an unpaid product out of the shop, a warning sound or the like are output, for example. Accordingly, it is possible to prevent an unpaid product from being brought out of the shop.

The autonomous mobile POS apparatus 10 determines whether or not elapsed time after reaching the target place to move exceeds a standby period registered in the schedule (step S314). If it is determined that the elapsed time exceeds the standby period (step S314, YES), the autonomous mobile POS apparatus 10 moves to the standby area 191 (step S315). On the other hand, it is determined that the elapsed time does not exceed the standby period (step S314, NO), the process returns to step S306.

As described above, in the present example embodiment, a customer makes payment by using the autonomous mobile POS apparatus 10 without intervention of a salesclerk in the display area 21 without limited to the register area 20. Thus, according to the present example embodiment, it is possible to perform a smooth checkout process.

Third Example Embodiment

The third example embodiment of the present invention will be described with reference to FIG. 7. The same components as those in the first example embodiment and the second example embodiment are labeled with the same references, and the description thereof will be omitted or simplified.

In the present example embodiment, a case where the shop 18 is an unmanned shop is assumed. The autonomous mobile POS apparatus 10 functions as a robot that serves a customer by interaction or the like, for example. An entry gate is installed at the entrance of the shop 18, and an exit gate that can read RFID chip information is installed at the exit of the shop 18. Each of the entry gate and the exit gate may be formed of flapper type gates having two flaps, for example, but may be formed using one flap.

Figure 7:
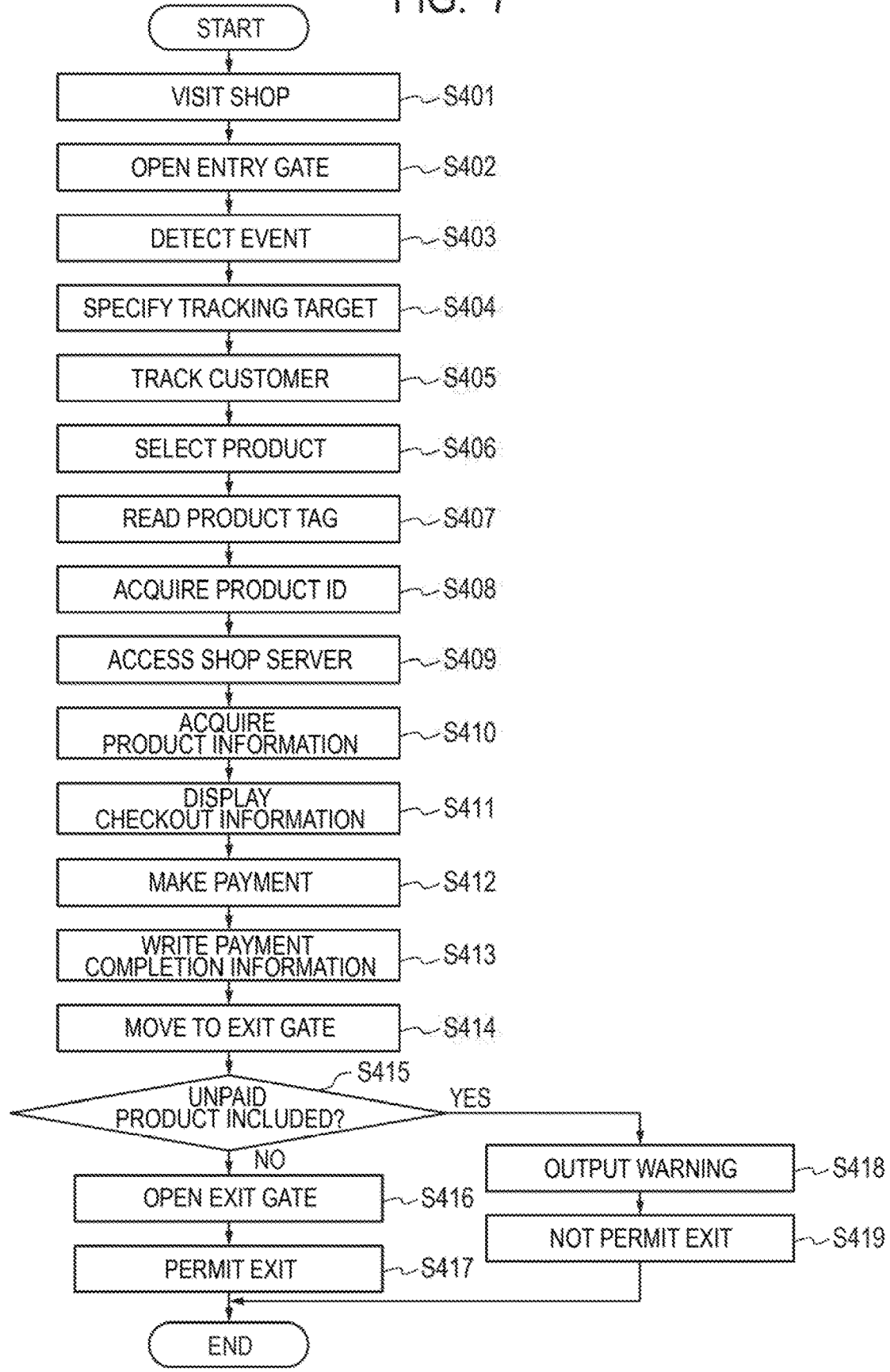
FIG. 7 is a flowchart illustrating an example of a checkout process using the autonomous mobile POS apparatus according to a third example embodiment.

FIG. 7 is a flowchart illustrating an example of a checkout process using the autonomous mobile POS apparatus 10 according to the present example embodiment.

First, when a customer visits the shop 18 and stands in front of the entry gate (step S401), the entry gate is opened (step S402). When the customer performs a predetermined event, the autonomous mobile POS apparatus 10 detects the event (step S403). The predetermined event may be, for example, performing predetermined movement, pressing a button, inputting a command, or the like. The predetermined movement may be, for example, a gesture such as raising a hand, opening a hand, shaking a hand, or the like. The autonomous mobile POS apparatus 10 specifies the customer who is a tracking target (step S404).

The autonomous mobile POS apparatus 10 tracks the customer while maintaining a constant distance to the customer by using the ranging device 107 (step S405). The constant distance is not particularly limited, which may be any distance so that shopping made by a customer is not obstructed and may be around 2 m, for example. The customer selects a product to be purchased (step S406) and uses the RFID reader/writer 111 to read a tag attached to the product to be purchased based on guidance as to how to use a self-service register displayed on the display device 105 (step S407). The guidance may be, for example, guidance as to how to have a product tag read, have an IC card read in electronic payment, supply a coin and input a bill in cash payment, or the like. Note that the autonomous mobile POS apparatus 10 may move closer to the customer based on a predetermined gesture or the like of the customer, and the customer may operate the autonomous mobile POS apparatus 10, for example. The autonomous mobile POS apparatus 10 acquires the product ID from an RFID chip embedded in a product tag by using the RFID reader/writer 111 (step S408). The autonomous mobile POS apparatus 10 accesses the shop server 12 via the wireless communication unit 106 (step S409) and acquires product information from a database based on the product ID (step S410). The autonomous mobile POS apparatus 10 displays payment information such as the product name, the price, or the like on the display device 105 (step S411). The customer makes payment by using the autonomous mobile POS apparatus 10 in the display area 21 based on the payment information displayed on the display device 105 (step S412). The autonomous mobile POS apparatus 10 writes payment completion information to the RFID chip embedded in the product tag by using the RFID reader/writer 111 (step S413). Thereby, it is possible to distinguish a paid product and an unpaid product. Note that the autonomous mobile POS apparatus 10 moves to a predetermined standby place after the checkout process.

The customer packs the product and moves to the front of the exit gate (step S414). If there is no unpaid product in the packed product (step S415, NO), the exit gate is opened (step S416), and the customer can exit the shop 18 (step S417). On the other hand, if there is an unpaid product in the packed product (step S415, YES), for example, a warning sound or the like are output (step S418), the exit gate is not opened, and the customer is unable to exit the shop 18 (step S419). Accordingly, it is possible to prevent an unpaid product from being brought out of the shop.

As described above, in the present example embodiment, a customer makes payment by using the autonomous mobile POS apparatus 10 in the display area 21 without limited to the self-service register area, for example, in an unmanned shop. Thus, according to the present example embodiment, it is possible to perform a smooth checkout process.

Fourth Example Embodiment

The fourth example embodiment of the present invention will be described with reference to FIG. 8.

Figure 8:
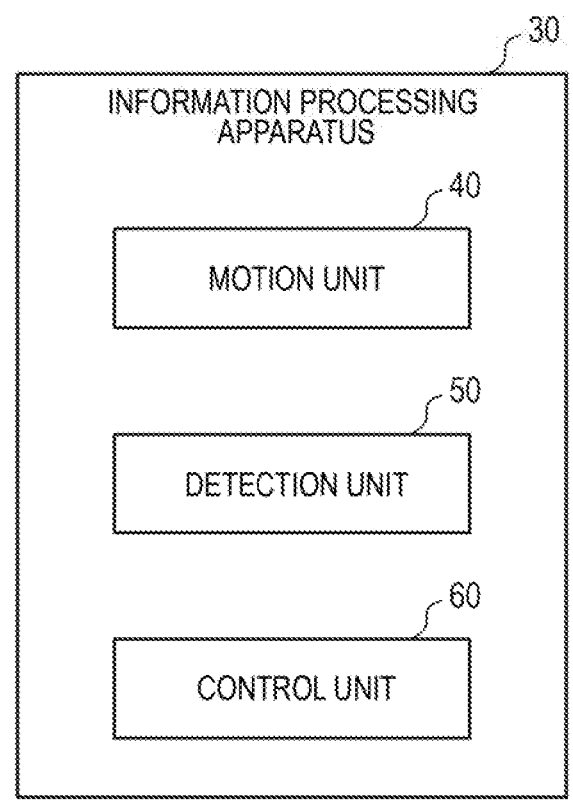
FIG. 8 is a block diagram of an information processing apparatus according to a fourth example embodiment.

FIG. 8 is a block diagram of an information processing apparatus 30 according to the present example embodiment. The information processing apparatus 30 has a motion unit 40 that performs a checkout process for a product or a service and causes the information processing apparatus 30 to autonomously move, a detection unit 50 that can detect a position of a person, and a control unit 60 that controls the motion unit 40 in accordance with the position of the person. According to such a configuration, a customer is able to make payment by using the information processing apparatus 30 that autonomously moves in a display area without limited to a register area. Thus, according to the present example embodiment, it is possible to perform a smooth checkout process.

Other Example Embodiments

The present invention is not limited to the example embodiments described above and can be changed as appropriate within a scope without departing from the spirit of the present invention.

Although the case where the autonomous mobile POS apparatus 10 calculates a people distribution density based on image information acquired by the network camera 15 to determine a target place to move has been described in the above example embodiments, the example embodiment is not limited thereto. For example, information related to a people distribution within a shop may be acquired by using the ranging device 107 to determine a target place to move. Further, a target place to move may be determined based on image information acquired by the camera 108. In such a case, the autonomous mobile POS apparatus 10 has a face authentication function, matches pre-registered face image data of salesclerks with a face included in an image acquired by the camera 108, and distinguishes whether the person captured by the camera 108 is a salesclerk or a customer. Thereby, the autonomous mobile POS apparatus 10 is able to move a place where many customers and few salesclerks are present, for example. Note that, when the autonomous mobile POS apparatus 10 has a face authentication function, a payment method may be face authentication payment. In such a case, the autonomous mobile POS apparatus 10 matches pre-registered face image data of customers with a face included in an image captured by the camera 108 to perform identity verification. If the identity verification is successful, payment is performed based on credit card information on a customer registered in association with the face image data, for example.

Further, although the case where the standby place of the autonomous mobile POS apparatus 10 is the standby area 191 has been described in the above example embodiments, the present invention is not limited thereto. The standby place may be any place where customer service or work made by a salesclerk, shopping made by a customer, motion of a person, or the like are not obstructed and may be an empty space of the register area 20 or the display area 21 or the like, for example.

Further, although the case where the charging place of the autonomous mobile POS apparatus 10 is the standby area 191 has been described in the above example embodiments, the present invention is not limited thereto. The charging place may be any place where a battery charger can be installed and where customer service or work made by a salesclerk, shopping made by a customer, motion of a person, or the like are not obstructed and may be an empty space of the register area 20 or the display area 21 or the like, for example.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

The whole or part of the example embodiments disclosed above can be described as, but not limited to, the following supplementary notes.

(Supplementary Note 1)

An information processing apparatus that performs a checkout process for a product or a service, the information processing apparatus comprising:

a motion unit that causes the information processing apparatus to autonomously move;

a detection unit configured to detect a position of a person; and a control unit that controls the motion unit in accordance with the position of the person.

(Supplementary Note 2)

The information processing apparatus according to supplementary note 1, wherein the control unit controls the motion unit so that the information processing apparatus moves in accordance with motion of the person.

(Supplementary Note 3)

The information processing apparatus according to supplementary note 1 or 2, wherein the detection unit further detects movement of the person, and wherein the control unit controls the motion unit so that the information processing apparatus autonomously moves in accordance with the movement.

(Supplementary Note 4)

The information processing apparatus according to any one of supplementary notes 1 to 3, wherein the control unit determines a target place to which the information processing apparatus moves based on a distribution of a plurality of persons.

(Supplementary Note 5)

The information processing apparatus according to supplementary note 4, wherein the control unit acquires information from an image capture unit installed in a shop to calculate the distribution.

(Supplementary Note 6)

The information processing apparatus according to any one of supplementary notes 1 to 5, wherein the control unit controls the motion unit based on a predefined schedule, and wherein the schedule includes information on at least one of time to start moving, a motion path, and a target place to move of the information processing apparatus.

(Supplementary Note 7)

The information processing apparatus according to any one of supplementary notes 1 to 6, wherein the control unit controls the motion unit so as to cause the information processing apparatus to move to a predetermined charging place when a battery level of a battery used for driving the motion unit decreases to a threshold or lower.

(Supplementary Note 8)

The information processing apparatus according to any one of supplementary notes 1 to 7, wherein the detection unit is configured to detect a distance to a ranging target.

(Supplementary Note 9)

The information processing apparatus according to any one of supplementary notes 1 to 8 further comprising a display unit that displays guidance for causing a customer to perform the checkout process.

(Supplementary Note 10)

The information processing apparatus according to supplementary note 9, wherein when the checkout process is performed by the customer, identification information that identifies that the checkout process was performed is added to the product, or the identification information is added to a medium that specifies the service.

(Supplementary Note 11)

An information processing method in an information processing apparatus that performs a checkout process for a product or a service, the information processing method comprising:

causing the information processing apparatus to autonomously move by a motion unit;

detecting a position of a person; and controlling the motion unit in accordance with the position of the person.

(Supplementary Note 12)

A storage medium storing a program that causes a computer to perform an information processing method in an information processing apparatus that performs a checkout process for a product or a service, the program comprising:

causing the information processing apparatus to autonomously move by a motion unit;

detecting a position of a person; and controlling the motion unit in accordance with the position of the person.

This application is based upon and claims the benefit of priority from Japanese Patent Application No. 2018-086927, filed on Apr. 27, 2018, the disclosure of which is incorporated herein in its entirety by reference.

REFERENCE SIGNS LIST 10 autonomous mobile POS apparatus
11 POS terminal
12 shop server
13 server
14 peripheral device
15 network camera
16 access point
17 intra-shop network
18 shop
19 backyard
20 register area
21 display area
100 base apparatus
101 CPU
102 ROM
103 RAM
104 storage device
105 display device
105a display
105b touch panel
106 wireless communication unit
107 ranging device
108 camera
109 drive unit
110 audio output unit
111 RFID reader/writer
112 position detection unit
113 button
114 code scanner
115 printer
116 contactless IC reader/writer
117 cash drawer
118 money processing unit
118a coin processing unit
118b bill processing unit
118c change processing unit
119 bus
120 power source unit
121 battery
122 connector
130 placement stage
191 standby area

The invention claimed is:

1. An information processing apparatus that performs a checkout process for a product or a service, the information processing apparatus comprising:

a motion unit that causes the information processing apparatus to autonomously move;

a detection unit configured to detect a position of a person; and a control unit that controls the motion unit based on at least one of a people distribution density and a number of persons at the position, wherein the control unit determines a target place to which the information processing apparatus moves based on a usage status of another information processing apparatus that is an autonomous mobile point of sale (POS) apparatus.

2. The information processing apparatus according to claim 1, wherein the control unit controls the motion unit so that the information processing apparatus moves in accordance with motion of the person.

3. The information processing apparatus according to claim 1, wherein the detection unit further detects movement of the person, and wherein the control unit controls the motion unit so that the information processing apparatus autonomously moves in accordance with the movement.

4. The information processing apparatus according to claim 1, wherein the control unit determines a target place to which the information processing apparatus moves based on the people distribution density.

5. The information processing apparatus according to claim 4, wherein the control unit acquires information from an image capture unit installed in a shop to calculate the people distribution density.

6. The information processing apparatus according to claim 1,
wherein the control unit controls the motion unit based on a predefined schedule, and
wherein the schedule includes information on at least one of time to start moving, a motion path, and a target place to move of the information processing apparatus.

7. The information processing apparatus according to claim 1, wherein the control unit controls the motion unit so as to cause the information processing apparatus to move to a predetermined charging place when a battery level of a battery used for driving the motion unit decreases to a threshold or lower.

8. The information processing apparatus according to claim 1, wherein the detection unit is configured to detect a distance to a ranging target.

9. The information processing apparatus according to claim 1 further comprising a display unit that displays guidance for causing a customer to perform the checkout process.

10. The information processing apparatus according to claim 9, wherein when the checkout process is performed by the customer, identification information that identifies that the checkout process was performed is added to the product, or the identification information is added to a medium that specifies the service.

11. An information processing method in an information processing apparatus that performs a checkout process for a product or a service, the information processing method comprising:
causing the information processing apparatus to autonomously move by a motion unit;
detecting a position of a person; and
controlling the motion unit based on at least one of a people distribution density and a number of persons at the position,
wherein controlling the motion unit comprises determining a target place to which the information processing apparatus moves based on a usage status of another information processing apparatus that is an autonomous mobile point of sale (POS) apparatus.

12. A non-transitory storage medium storing a program that causes a computer to perform an information processing method in an information processing apparatus that performs a checkout process for a product or a service, the program comprising:
causing the information processing apparatus to autonomously move by a motion unit;
detecting a position of a person; and
controlling the motion unit based on at least one of a people distribution density and a number of persons at the position,
wherein controlling the motion unit comprises determining a target place to which the information processing apparatus moves based on a usage status of another information processing apparatus that is an autonomous mobile point of sale (POS) apparatus.

13. The information processing apparatus according to claim 1, wherein the control unit determines a place where the people distribution density exceeds a first predetermined threshold or a place where more of the persons than a second predetermined threshold are present in a predetermined place in a shop as a target place to which the information processing apparatus moves.

14. The information processing apparatus according to claim 13, wherein the control unit determines a place where the ratio of the number of salesclerks to the number of customers is less than or equal to a predetermined value, as the target place to which the information processing apparatus moves.

15. The information processing apparatus according to claim 1, wherein the control unit transmits a help request notification to a salesclerk when the people distribution density exceeds a first predetermined threshold or when more of the persons than a second predetermined threshold are present in a predetermined place in a shop.

16. The information processing apparatus according to claim 1, wherein the control unit controls the checkout process when the information processing apparatus is at the position of the person.

* * * * *